(12) United States Patent
Arneson et al.

(10) Patent No.: US 11,979,394 B2
(45) Date of Patent: May 7, 2024

(54) SECURE COMMUNICATION WITH RANDOM NUMBERS

(71) Applicant: Matrics2, Inc., Warba, MN (US)

(72) Inventors: Michael R. Arneson, Warba, MN (US); William R. Bandy, Gambrills, MD (US)

(73) Assignee: MATRICS2, INC, Warba, MN (US)

(*) Notice: Subject to any disclaimer, the term of this patent is extended or adjusted under 35 U.S.C. 154(b) by 0 days.

(21) Appl. No.: 17/934,862

(22) Filed: Sep. 23, 2022

(65) Prior Publication Data
US 2023/0029228 A1    Jan. 26, 2023

Related U.S. Application Data

(63) Continuation of application No. 16/365,457, filed on Mar. 26, 2019, now Pat. No. 11,483,306.

(60) Provisional application No. 62/648,258, filed on Mar. 26, 2018.

(51) Int. Cl.
| | | |
|---|---|---|
| *H04W 12/65* | (2021.01) | |
| *G06F 7/58* | (2006.01) | |
| *H04L 9/40* | (2022.01) | |

(52) U.S. Cl.
CPC ............ *H04L 63/0838* (2013.01); *G06F 7/58* (2013.01)

(58) Field of Classification Search
CPC ............ H04L 63/0838; H04L 63/0861; H04L 2209/38; H04L 9/3231; H04L 9/3239; H04L 9/0662; G06F 7/58; H04W 12/65; H04W 12/77; H04W 12/068; H04W 12/35
See application file for complete search history.

(56) References Cited

U.S. PATENT DOCUMENTS

| | | | |
|---|---|---|---|
| 9,729,315 B2 ‡ | 8/2017 | Statica | H04L 9/0822 |
| 9,852,418 B2 ‡ | 12/2017 | Mardikar | G06Q 20/32 |
| 11,163,899 B2 ‡ | 11/2021 | Kishi | G06F 16/532 |
| 11,483,306 B2 | 10/2022 | Arneson et al. | |
| 2012/0185398 A1 ‡ | 7/2012 | Weis | G06Q 20/401 705/75 |
| 2012/0204032 A1 ‡ | 8/2012 | Wilkins | H04L 63/0428 713/170 |
| 2014/0362235 A1 ‡ | 12/2014 | Kishi | H04N 1/00244 348/207.1 |
| 2014/0373170 A1 ‡ | 12/2014 | Brudnicki | H04L 63/00 726/27 |

(Continued)

FOREIGN PATENT DOCUMENTS

| | | | |
|---|---|---|---|
| WO | 2014/201149 A1 | 12/2014 | |
| WO | WO-WO-2014201149 A1 ‡ | 12/2014 | H04L 63/083 |

OTHER PUBLICATIONS

C.E. Shannon, "Communication Theory of Secrecy Systems," Bell System Technical Journal, Jul. 1948, p. 656-715, 60 p. (retyped copy submitted).‡

(Continued)

*Primary Examiner* — Lynn D Feild
*Assistant Examiner* — Abdullah Almamun
(74) *Attorney, Agent, or Firm* — Weaver IP L.L.C.

(57) ABSTRACT

Methods, systems, and apparatuses for secure communications in a communications system through a secure database (SDB) using random numbers including, one-time use random number cipher keys.

20 Claims, 9 Drawing Sheets

(56) References Cited

U.S. PATENT DOCUMENTS

| | | | | |
|---|---|---|---|---|
| 2016/0104154 A1 ‡ | 4/2016 | Milov | ............... | G06Q 20/4012 |
| | | | | 705/67 |
| 2017/0300716 A1 ‡ | 10/2017 | Reisgies | ............. | G06F 21/6245 |
| 2018/0234255 A1 * | 8/2018 | Fu | ............................. | H04L 9/30 |
| 2018/0255033 A1 * | 9/2018 | Kanaya | ................ | H04W 12/03 |
| 2019/0174304 A1 * | 6/2019 | Tunnell | ................ | H04W 12/50 |
| 2019/0297074 A1 | 9/2019 | Arneson et al. | | |

OTHER PUBLICATIONS

Kelsey, John et al., "Cryptanalytic attacks on pseudorandom number generators," International Workshop on Fast Software Encryption, pp. 168-188. Springer, 1998.‡
U.S. Appl. No. 16/365,457, filed Mar. 26, 2019, M. Arneson et al.
C.E. Shannon, "Communication Theory of Secrecy Systems," Bell System Technical Journal, Jul. 1948, p. 656-715, 60 pages (retyped copy submitted).

\* cited by examiner
‡ imported from a related application

200

Acronyms

| | |
|---|---|
| Random Number Identification | RNID |
| Read Only Memory | ROM |
| Near Field Communication | NFC |
|     NFC | NFC |
| Smart Phone Reader | SPR |
|     SPR App | APP |
|     Cloud Data Base | DB |
|     product manufacture customers | MC's |
| Customer Database | CDB |
| Manufacturer Data Link | MDL |
| Store Product Database | SDB |
| Personal Data Base | PDB |
| Distribution Center | DC |
| Personal Assistant Software Entity | PASE |
| Over The Counter | OTC |

SECURE COMMUNICATION WITH RANDOM NUMBERS

CROSS-REFERENCE TO RELATED APPLICATIONS

This application is a continuation of U.S. Ser. No. 16/365,457, filed Mar. 26, 2019, entitled "Secure Communication with Random Numbers," which claims priority to U.S. Provisional Patent Application No. 62/648,258, filed Mar. 26, 2018 and entitled "Secure Communication with Random Numbers," the entirety of each of which is incorporated by reference herein.

BACKGROUND OF THE INVENTION

Field of the Invention

The present patent application relates to secure communications in a communications system through a secure data base (SDB) ecosystem using random numbers, including using one-time use random number cipher keys.

Background Art

The "one-time pad" developed by Gilbert S. Vernam has been used for decades for encoding and decoding messages. Although such an approach provides unbreakable security, it relies on both the sending and receiving parties having the same random cipher key. In the old days this was accomplished by the physical delivery of keypads to the parties for their one-time use and disposal. Such a delivery method today is impractical and presents a huge barrier for the effective use of this concept. There have been many attempts to solve this problem, such as with Diffie-Hellman, but they all have security vulnerabilities.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, apparatuses, systems, and computer readable storage media are disclosed herein directed to a secure database (SDB) ecosystem, which creates and distributes random numbers (RNs) of any suitable length, including in the order of anywhere from 256 to 4096 bits or greater, to be used as the cipher keys for encoding and decoding messages. Methods, apparatuses, systems, and computer readable storage media are also directed to Secure User Interface Transaction (SUIT) Apps that are downloaded from the SDB onto mobile and fixed communication platforms, such as smartphone, tablets, and computers, or the like, to provide total communication platform security. Methods, apparatuses, systems, and computer readable storage media are also directed to secure communications interfaced through an SDB using one-time use random number cipher keys.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a list of acronyms associated with the embodiments disclosed herein.

Figure 1:
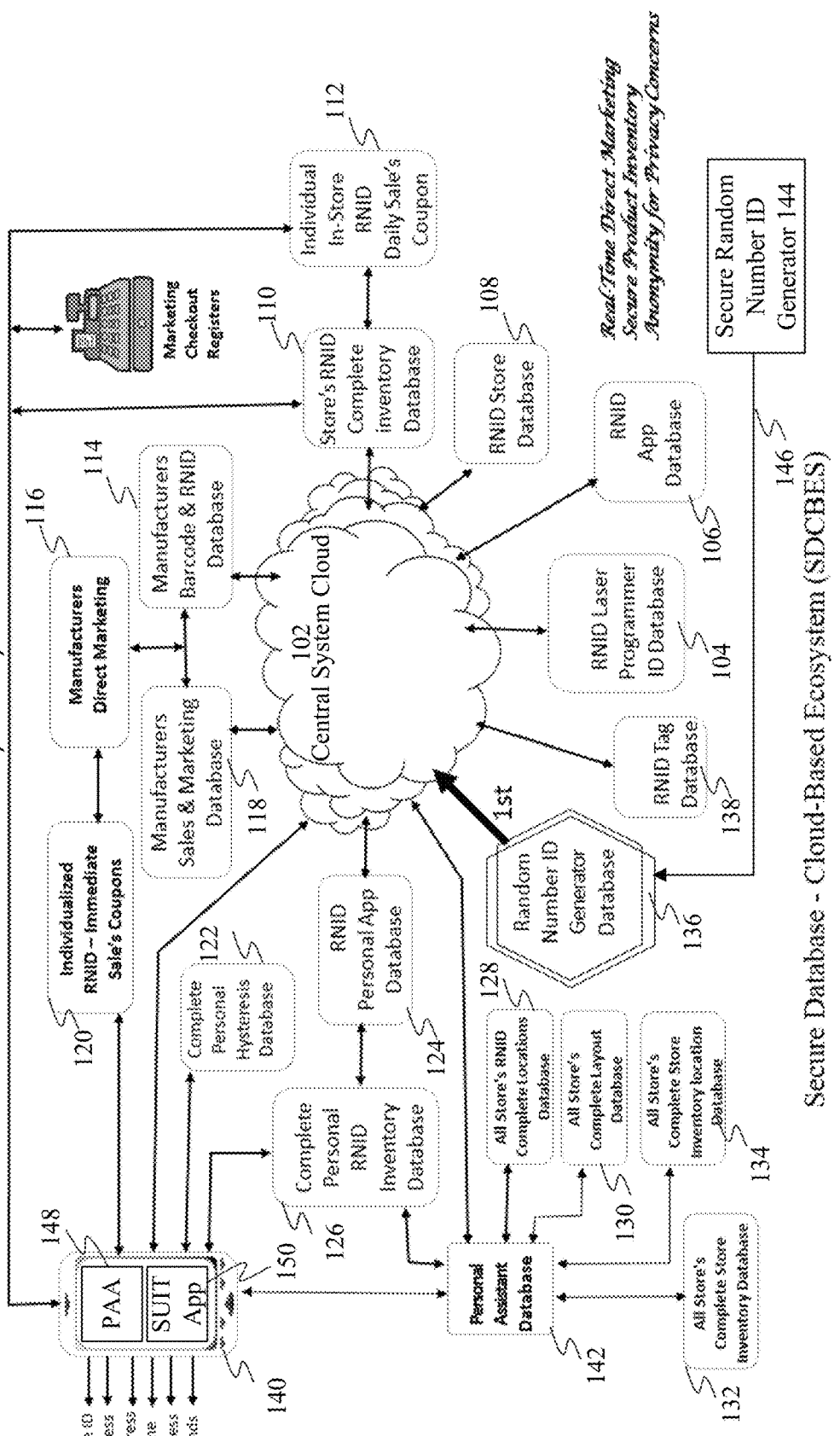
FIG. 1 shows an example block diagram of a secure block chain ecosystem, according to example embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

The example embodiments described herein are provided for illustrative purposes and are not limiting. The examples described herein may be adapted to any type of secure communications through a secure database (SDB) ecosystem using one-time use random number cipher keys. Further structural and operational embodiments, including modifications/alterations, will become apparent to persons skilled in the relevant art(s) from the teachings herein.

The advent of quantum computers will cause communication and data encryption based on current cryptologic techniques, such as public-private key approaches, to be quickly attacked, on the order of minutes, and therefore no longer be secure. Theoretical analysis has shown that the most secure encryption approach is the one-time random number cipher pad where each party has access to the same random number for one-time use. This approach is also known as a symmetric cipher where both the sender and receiver have the same key, as apposed to asymmetric ciphers where the sender and receiver have different keys, such as with public-private RSA. A 128-bit symmetric key has been shown to be the equivalent security strength of a 3072-bit asymmetric key and a 512-bit elliptic curve cipher. Claude Shannon (ref) proved, using information theory considerations, that any theoretical unbreakable cipher must have keys which are at least as long as the plain text and used only once (the one-time pad). However, a thus-far insurmountable problem has been how to distribute these numbers in a secure way, which in itself would need to be symmetrically secured. Disclosed herein is a communication system that is secured through one-time use of random number cipher keys that solves this fundamental problem with the worse case assumption that all data transmissions are in the clear and wide open to eavesdropping Disclosed embodiments center on a secure database (SDB) ecosystem, which creates and distributes random numbers (RNs) of the order of 256-bits to 4098 bits or more to be used as the cipher keys for encoding and decoding messages, as random number IDs (RNIDs) for NFC tags and as block chain transaction identifiers.

Such an ecosystem may be configured in various ways. For instance, FIG. 1 describes an example block diagram of a complete secure block chain ecosystem 100 (also referred to as "SDB" herein), according to embodiments. As shown in FIG. 1, secure block chain ecosystem 100 includes a Central System Cloud 102, which is the central nervous system and the backbone to the complete secure block chain ecosystem 100. Secure block chain ecosystem 100 begins operation with a secure random number ID generator 144 that generates RNIDs 146 for every database shown in FIG. 1, including those for the RNID Laser programmer 104 configured to program each single die on each wafer, as well as the database which is assigning a unique RNID to every smartphone and/or APP creating a complete secure network. RNIDs 146 generated by secure random number ID generator 144 may be stored in a random number ID generator database 136 shown in ecosystem 100 in FIG. 1, and/or in the specific database for which RNIDs are generated.

As shown in FIG. 1, system 100 also includes a RNID App Database 106, a RNID Store Database 108, a one or more store-specific RNID Complete inventory Databases 110, an Individual In-Store RNID Daily Sale's Coupon 112, a Manufacturers Barcode & RNID Database 114, a Manufacturers Sales & Marketing Database 118, an Individualized RNID—Immediate Sales Coupons 120, a Complete Personal Hysteresis Database 122, a RNID Personal App Database 124, a Complete Personal RNID Inventory Database 126, an All Store's RNID Complete Locations Database 128, an All Store's Complete Layout Database 130, an All Store's Complete Store Inventory Database 132, an All Store's Complete Store Inventory location Database 134, RNID Tag Database 138, and Personal Assistant Database 142. As also shown in FIG. 1, smartphone 140 includes a personal assistant app 148 (e.g., referred to as "Solo Mio" for illustration) that executes thereon. FIG. 2 shows a list of acronyms that defines acronyms used in the present specification and FIG. 1, as well as in the remaining figures.

Note that each database shown in FIG. 1 may be configured in various ways. For example, each database may store data including RNIDs in any format, including in lists, arrays, tables, etc. Each database may include separate storage, or any databases may share storage. Examples of such storage include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Central system cloud 102, which may also be referred to as "Central Management System", may include any type of communication network, including a local area network (LAN), a wide area network (WAN), a personal area network (PAN), or a combination of communication networks, such as the Internet. Central system cloud 102 may include storage that encompasses the databases shown in FIG. 1, and includes a networked set of computing resources, including servers, routers, etc., that are configurable, shareable, provide data security, and are accessible over a network such as the Internet to host and operate the databases and secure random number ID generator 144. In an embodiment, the computing resources may be co-located (e.g., housed in one or more nearby buildings with associated components such as backup power supplies, redundant data communications, environmental controls, etc.) to form a datacenter, may be separately located, or may be arranged in other manners.

Smartphone 140 and each database of FIG. 1 may include one or more wired and/or wireless network interfaces that enable communication with each other and any other device directly or via central system cloud 102. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface.

Each component of FIG. 1 is described as follows:

Personal assistant app (PAA) 148 is an instance of a personal assistant application, such as a personal assistant software (PAS) agent (referred to herein as "PAS"), also known as a virtual assistant. For instance, PAA 148 may be downloaded by a user from RNID Personal App Database 124, from an App store, or elsewhere, depending on the particular configuration of ecosystem 100. Personal assistant app 148 is implemented in computer code executed by a processor of smartphone 140, programmed according to any suitable programming language and/or scripting language, such as C++, C #, HTML (hypertext markup language), JavaScript, etc., and may be configured to obtain information from other databases of FIG. 1 (e.g., manufacturers and/or store/retailers databases 126), and to provide a user interface for a user at smartphone 140. Personal assistant app 148 is further configured to transmit and obtain information from a personal database associated with the user of smartphone 104. In embodiments, personal assistant app 148 may be any type of application capable of obtaining and displaying item information, as well as enabling a user to use functionality of smartphone 140 to interact with items, such as by reading RFID tags, scanning barcodes or other item identifiers, etc., and enables communications with manufacturers and retailers through the use of random identifiers managed in ecosystem 100.

A second app downloadable to user devices, such as smartphone 140, is referred to herein as a Secure User Interface Transaction (SUIT) app 150. For instance, SUIT app 150 may be downloaded by a user from RNID App Database 106, from an App store, or elsewhere, depending on the particular configuration of ecosystem 100. As described in further detail elsewhere herein, SUIT app 150 is used by users to manage the RNID assigned to smartphone 140 by ecosystem 100 (e.g., by RNID App Database 106), so that a user of the user device can engage in secure purchases and other secure transactions, as described herein. Similar to personal assistant app 148, SUIT app 150 is implemented in computer code executed by a processor of smartphone 140, programmed according to any suitable programming language and/or scripting language, such as C++, C #, HTML (hypertext markup language), JavaScript, etc., and may be configured to obtain information from other databases of FIG. 1, and to provide a user interface for a user at smartphone 140. In embodiments, SUIT app 150 may be any type of application capable of obtaining and displaying item information, as well as enabling a user to use functionality of smartphone 140 to engage in secure purchases and other secure transactions through the use the RNID assigned to smartphone by RNID app database 106.

Note that although PAA 148 and SUIT app 150 are shown as separate apps in FIG. 1, in an alternate embodiment, PAA 148 and SUIT app 150 may be combined together into a single app.

RNID App Database 106 is configured to assign and store the RNIDs assigned to SUIT app 150 downloaded to user devices such as smartphone 140, as well as maintaining each authorized user's contact information, as described herein. In an embodiment, instances of SUIT app 150 may be downloaded to user devices from RNID App Database 106, along with or separate from the RNIDs assigned to the downloaded SUIT app 150, as described herein.

RNID Store Database 108 is configured to store each RNID of every stores/retail establishment (e.g., every brick and mortar or internet store) that is participating with the security ecosystem and who have received RNIDs for their particular store identity, which allows them to interface patrons with their particular products information including their daily store coupons, as described herein.

Store-specific RNID Complete Inventory Database 110 is configured for individual stores to assign their own RNID's purchased from the SDB owner/manager to each and every item in the store including each product's unique information including daily coupons, as described herein.

Individual In-Store RNID Daily Sale's Coupon 112 is a way to incentive store shoppers to buy their products on the spot, as described herein.

Manufacturers Barcode & RNID Database 114 is configured to interface each manufacturer's barcode information system to their new RNIDs database system, products data etc. and information on how to communicate with them, as described herein.

Manufacturers Direct Marketing Manager 116 is configured to interface manufacturers with user devices, such as smart phone 140, to perform direct marketing to the customers (e.g., users of the user device) via RNIDs assigned and managed by database 118, as described herein.

Manufacturers Sales & Marketing Database 118 is configured to stores RNIDs for direct marketing back to customers viewing and purchasing their product real-time, as described herein.

Individualized RNID—Immediate Sales Coupons 120 are for direct marketing to customer apps who are looking at their product, as described herein.

Complete Personal Hysteresis Database 122 is configured to store product information of items purchased by consumers to be interfaced with by the Personal Assistant App, as described herein.

RNID Personal App Database 124 is configured for every product an individual had ever purchased, received or inventoried into their own personal inventory. It then stores each manufacturer's or store's products' RNIDs, learns all products information or data that has been associated, or mined on it, and with their PAA 148 can then make intelligent decisions about that product if asked, as described herein. In an embodiment, instances of PAA 148 may be downloaded to user devices from RNID Personal App Database 124, along with or separate from the RNIDs assigned to the downloaded PAA 148, as described herein.

Complete Personal RNID Inventory Database 126 is configured to store each and every item of product information for products purchased, received, or inventoried personally to the user of the PAA 148, as described herein.

All Store's RNID Complete Locations Database 128 is configured to each store GPS coordinates or HTTP locations of all the participating stores, as described herein.

All Store's Complete Layout Database 130 is configured to store the floor plans of each participating store, as described herein.

All Store's Complete Store Inventory Database 132 is configured to store every single store or manufacturers items or products that have an RNID associated to it, as described herein.

All Store's Complete Store Inventory location Database 134 is configured to store where items are on the store floor plan so that shoppers can go directly to the desired item, as described herein.

RNID Tag Database 138 is configured to store every RNID that has been created and sent to manufacturers, as described herein.

Personal Assistant Database 142 is configured to store data of each interaction of the user's PAA 148 app and SUIT app 150 that have occurred during every shopping excursion so that the user can call up specifics for both current and later actions, such as purchasing an item, as described herein.

Figure 3:
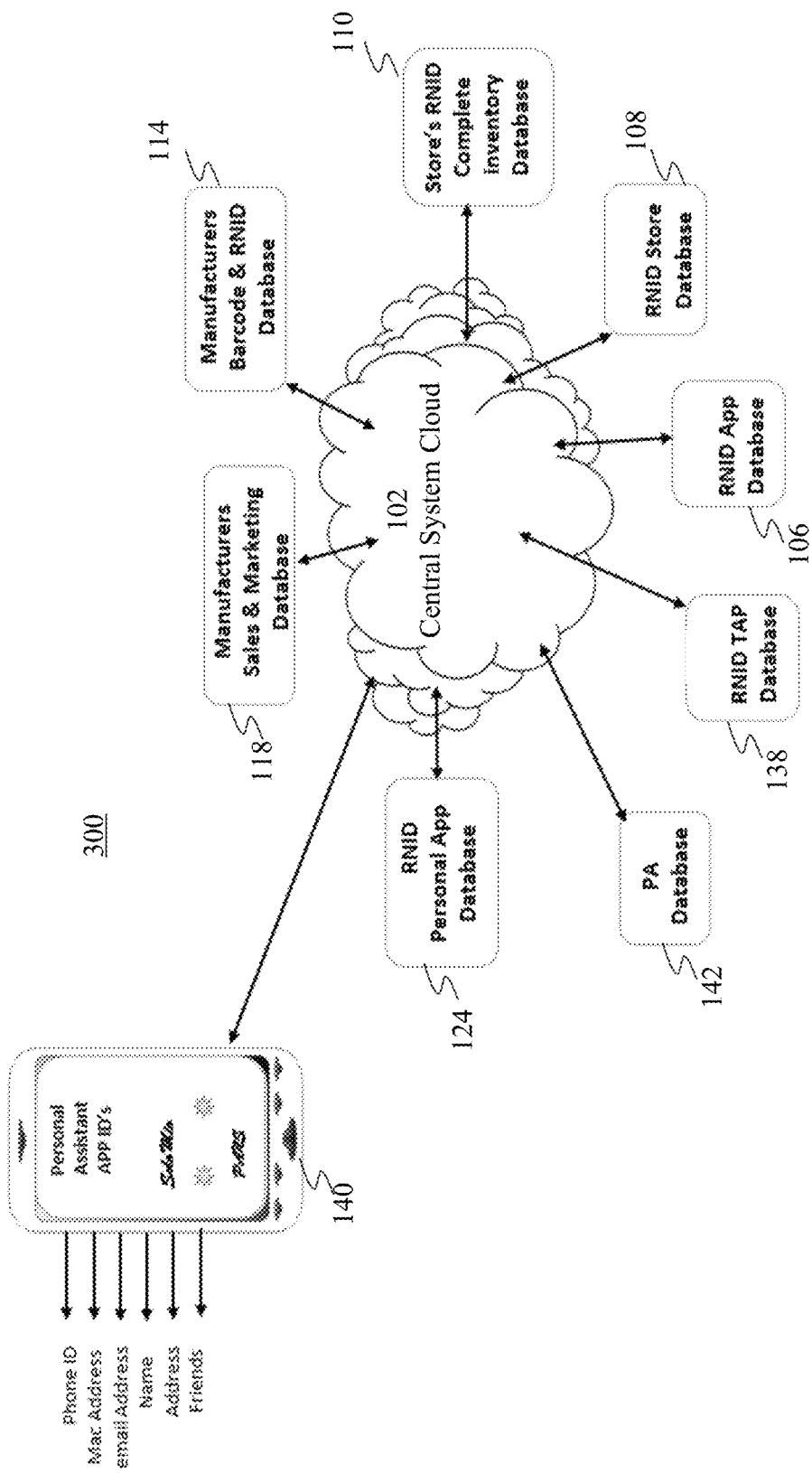
FIG. 3 show an example assignment of unique RNID databases to smartphones, other devices, and/or APPs creating a complete secure network, according to example embodiments.

FIG. 3 shows the assignment of unique RNID databases to smartphones and/or APPs creating a complete secure network 200, according to example embodiments. FIG. 3 further shows how each unique RNID and each of their databases enable the ability to use those smartphone(s) and/or APPS securely and with complete privacy. As shown in FIG. 3, ecosystem 300 may include further secure databases for every brick and mortar store, every store's inventory, every manufacturer, every manufacturers product barcode, all manufacturers sales & marketing data, complete database hysteresis, all manufacturing and store couponing as well as many more different secure databases for directions, instructions, warranties, products life-cycle, smart appliances, smart homes. Furthermore, each RNID also enables each of these databases for Chain Supply applications such as for loss prevention, inventory, just-in-time-delivery, and future secure block-chaining.

Figure 4:
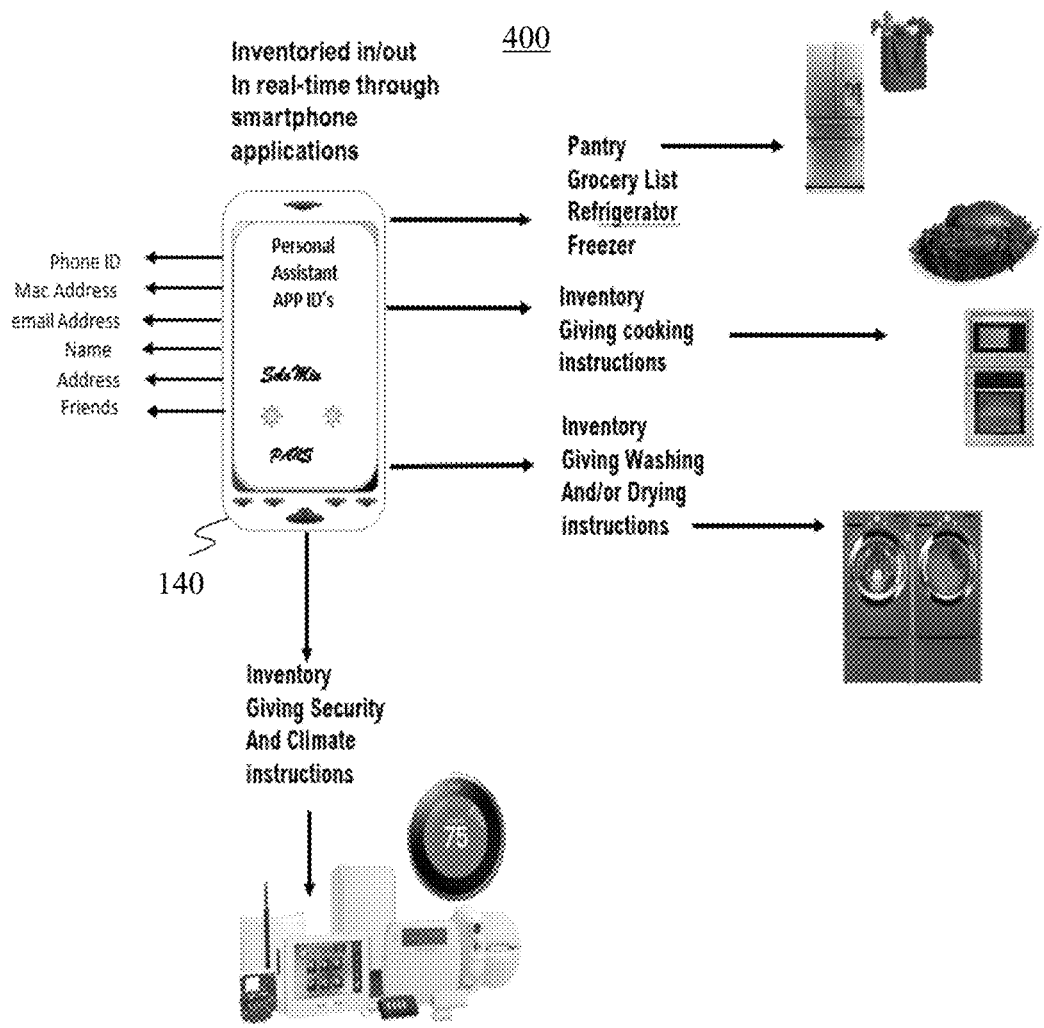
FIG. 4 shows an example diagram of how each generated RNID would enable manufacturers' products or inventory the ability to fulfill a unique action, according to an example embodiment.

FIG. 4 shows an example diagram 400 of how each generated RNID enables manufacturers' products or inventory the ability to fulfill a unique action. For instance, and as shown in FIG. 4, the personal assistant app 148 that executes on smartphone 140 ("Application" or "APP") inventories RNID purchases that are brought into the personal environment, such as those in their pantry, refrigerator, freezer, washers and dryers, also clothing. Once the items are defined and inventoried within their personal database online data is mined and assigned for each product's RNID. For example, if one wanted to ask my APP "how do I cook my turkey" the APP knows (i.e., stores and/or can determine) what turkey and its weight because it was inventoried as it was placed in the freezer or refrigerator. The APP also knows how long it was in there and if it needs to be thawed or not. It knows what type/make/model your oven is and how it cooks turkeys and could tell you times and temperatures, etc. The APP may look up recipes and cooking instructions, as well as each of the required ingredients which were in the pantry. Another example, as shown in FIG. 4, clothes washer and dryer appliances may have readers that can automatically read the RNID's within the clothes and automatically wash and dry them according to their material care specifications (which can be looked up on the Internet or elsewhere once the clothes are identified by their RNID). A final example, as further shown in FIG. 4, the RNID could define each security node/sensor within a known wireless and/or hardwired network.

The creation of ecosystem 100 will now be discussed. An initial issue is the integrity of the RN itself by secure random number ID generator 144, which should be absolutely random to be unbreakable as a cipher key and cannot be repeatable. Approaches that use pseudo random number generators that yield repetition have been successfully broken and exploited (e.g., see www.schneier.com/academic/paperfiles/paper-prngs.pdf). Therefore, a random number generator based on basic random event physics, such as radioactive decay, may be employed by secure random number ID generator 144. Second, the SDB is a binary tree-walking structure that allows RN retrieval in n-steps where n is the number of bits in the RN. As a new RN is being generated, bit-by-bit, it will query the SDB by walking down the tree to ensure the new RN does not duplicate a previously generated number. Also, the number of 0's and 1's branching off each node within the tree should be equal for a true random process and can be continuously monitored to ensure this goal is achieved. With these processes the integrity of the RN SDB is assured.

The user interface for RN and RNID transactions is SUIT app 150 that is downloaded from the SDB onto mobile and fixed communication platforms, such as smartphones, tablets and computers, or the like, which provide for authorized user authentication.

Each SUIT app 150 has its own unique RNID identifier, referred to as ARNID (application RNID), which it uses for all transactions and is the public identifier for the SUIT. After download, SUIT app 150 enrolls user identification information, such as facial recognition and fingerprints, that it uses to authenticate the user for further SUIT interactions. It then instructs the user, at their convenience, to stop by a local authorized kiosk or cellphone service provider store to pick up a RN Key card RNKC. The RNKCs could also be available at common retail outlets or stores, such as gas station, grocery stores, convenience stores, or the like. They could also be dispensed by vending machines. There, a RNKC will be presented or sold to the user. The RNKC may be formed of a disposable substrate, such as paper, with two NFC tags attached a distance apart (e.g., about two inches), each programed with a unique 256 bit, or greater, RN. At the user's convenience, the user instructs the SUIT into "key acquisition" (KA) mode, at which point the SUIT instructs the use to "tap" the phone to one of the tags for it to read the tag's RN, which the SUIT sends to the SDB along with its ARNID. The RNs of the two tags on the RNKC will have been previously created and paired in the database as a RNK and key identifier (KI) RNKCP pair (RNKCP). The RN sent to the SDB by the SUIT will now become the KI of the RNKCP and the other will become the first RNK1 associated with the SUIT ARNID. Next the user is instructed to "tap" the other tag and the smartphone will read that tag's RN, which the SUIT reads into its memory as its first RNK1. The RNKC then is destroyed, such as by a paper shredder, so that it cannot be read again.

Figure 7:
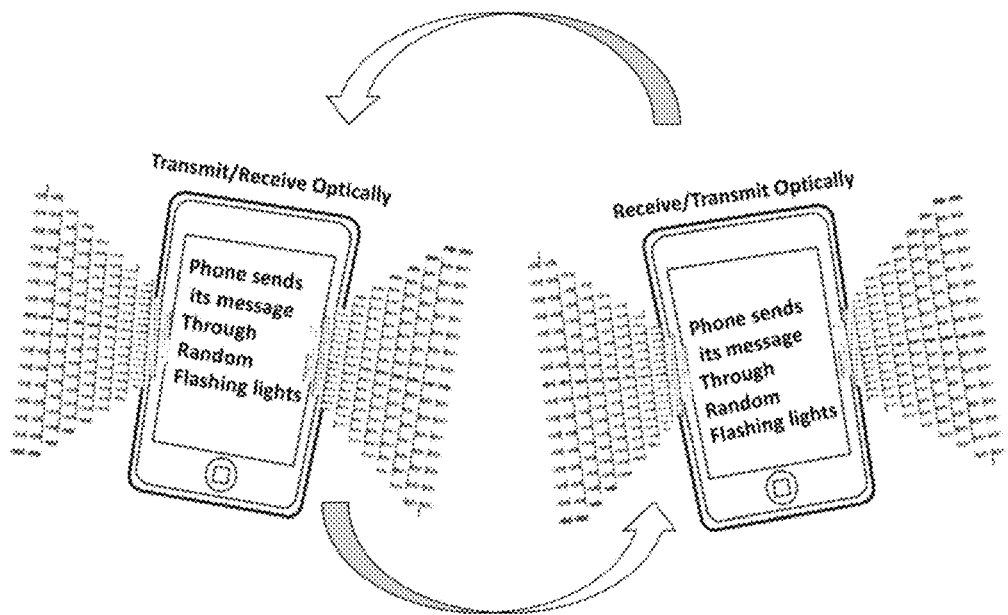
FIG. 7 shows an example diagram of how each device can transmit secure data optically by modulating data randomly through the device's own flashing light mechanisms, according to example embodiments.

For instance, FIG. 7 shows an example diagram 700 of a NFC Secure device to user phone "One Tap" using either the phones own vibration, optical and auditable mechanisms as well as inductively (NFC) allowing for the "One Tap" of a Secure Device to a different or user phone to acquire its first RN Key, according to example embodiments.

Alternatively, the RNKC could be printed with a pattern, such as a two-dimensional barcode, that the smartphone would read optically with the camera.

The first message from the SUIT to the SDB will be encoded with RNK1 and sent along with the ARNID. On receipt, the SDB looks up the RNK1 associated with the ARNID, decodes it with RNK1, creates a new RNK2, and encodes that along with a return message with RNK1. The RNK2 replaces the RNK1 in the SDB stored under ARNID.

The SUIT decodes the message from the SDB with RNK1 to read the return response and to retrieve the new RNK2, and replaces RNK1 with RNK2, for further communication with the SDB. In this way, with every communication with the SDB the RNK is continuously and securely updated, achieving symmetric one-time pad security.

Now let's step back and look at the security vulnerabilities in the era of quantum computer eavesdropping and how this approach overcomes them. The only thing an observer can see is a string of random numbers passed back and forth between the SUIT and the SDB, along with the SUIT ARNID, which is the public face of the SUIT. The only way to decode anything is by grabbing that first RNK1, which is never sent in the clear. But it does suggest that the RNKC card should be destroyed after the SUIT extracts the RNK1. Further, any gap of observer surveillance, with missed communication exchanges, will lose key continuity, foiling any further attempt at decoding. Therefore, this approach will deliver continuous, virtually unbreakable security. Also, at any time a user desires, they can purchase or otherwise attain a new RNKC to acquire a new key.

An explanation of how the RNKCP is created follows. The NFC tags are created by a process described in (patent application 62/637,304). The tags all have their own unique RN IDs (RNIDs), which have been created and stored in the SDB. When the tag pairs are attached to a disposable substrate, such as paper, to create the RNKC's, they are read one at a time, serially, and the RNs are sent to the SDB with the instructions to pair them in the database as RNDCPs.

Alternatively, the RN pairs would be formatted for optical reading and then sent to a printing facility to print the RNKCs.

Another approach of delivering the first RNK1 to the user's SUIT is now described.

The NFC tags are comprised of an integrated circuit (IC) chip attached to an antenna substrate. Each chip has a read-only memory that has been programmed with a unique RN. They are "passive" devices powered up by the NFC smartphone reader (e.g., by the tag receiving the reader's carrier signal at the antenna, and storing energy from the received carrier signal in a battery, one or capacitors, or other energy storage device) to retrieve their RNs.

An "electronic tag" (ET) that emulates the function of the NFC passive tag is next described.

An ET is a circuit that controls a dynamically changeable memory, such as an SRAM, so new RNs can be loaded into it for readout by the NFC smartphone reader. This circuit drives an antenna for communication with the NFC smartphone. The ET is connected by a secure data link to the SDB, so that the SDB can securely download RNs to the ET for readout. The secure data link is accomplished the one-time pad RNK process previously described. The NFC reader already has the hardware in it to also serve as an ET, controlled by the SUIT.

Figure 8:
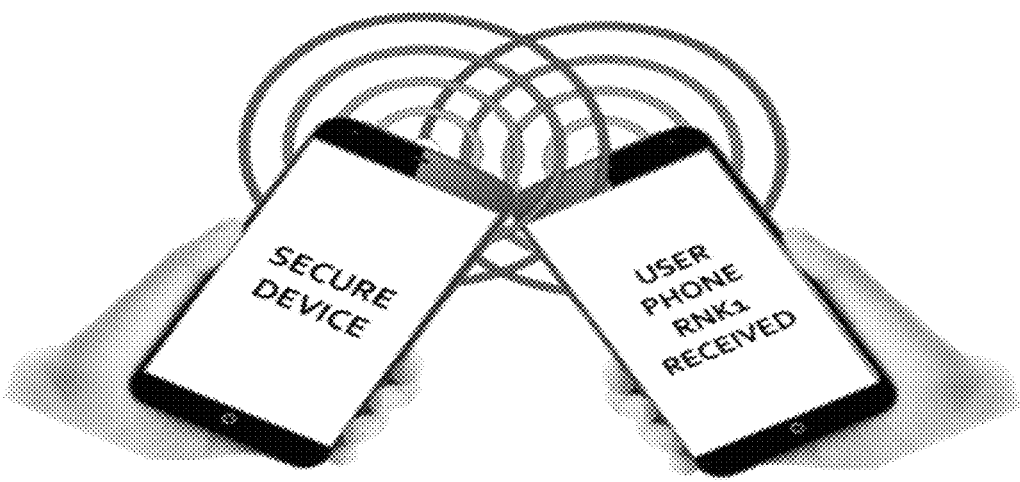
FIG. 8 shows an example diagram of a NFC Secure device to user phone "One Tap" using either the phone's own vibration, optical, and/or auditable mechanisms as well as inductively (e.g., NFC) allowing for the "One Tap" of a Secure Device to a different user phone to acquire its first RN Key, according to example embodiments.

When a new user downloads their SUIT from the SDB, and after user "enrollment" with biometric authentication data by the SUIT, the SUIT instructs the user to acquire its first key, RNK1, from any secure device (SD), such as ETs located on internet or cellular connected devices, such as ATMs and other smartphones that have been secured by key acquisition. The user instructs the SUIT into key acquisition mode, and then the user taps their phone to the SD, such a secure phone. The user phone and the SD communicate via the short range (e.g., within an inch) magnetic near field coupling (non-radiating) using ET tag emulation mode and NFC tag read mode so that the user phone provides the SD with its ARNID, which is sent to the SDB with the instructions to create a first RNK1 for the user device, which is sent securely to the SD, which then sends it to the user phone. Thereby, with "one tap" to a SD the user phone acquires its first RNK1, as shown in FIG. 8.

Figure 5:
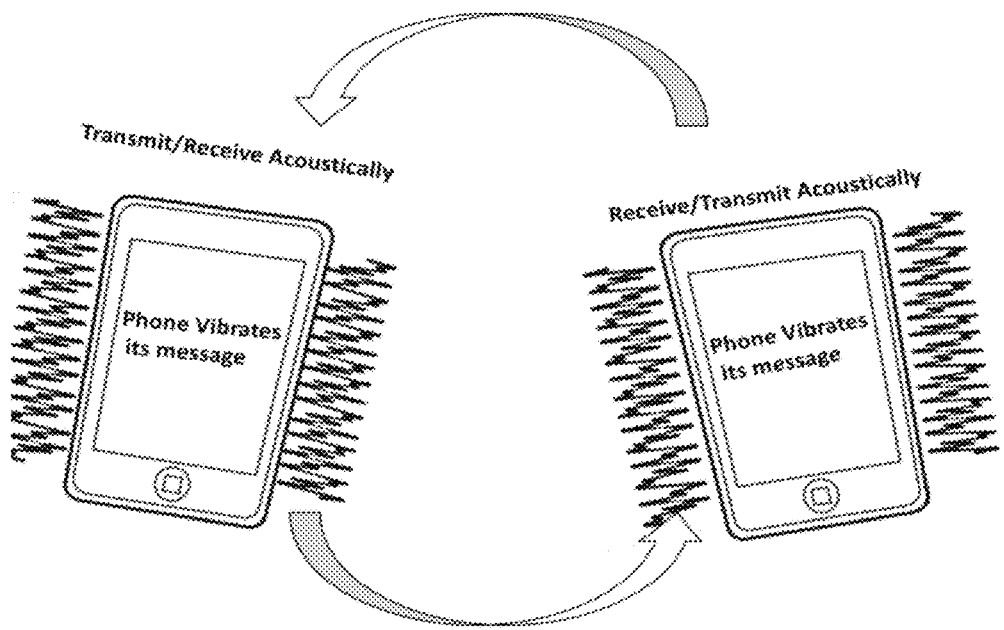
FIG. 5 shows an example diagram of how each device (e.g., smartphone) can transmit secure data acoustically by modulating data through the device's own vibration mechanism, according to example embodiments.

Phones/smartphones can be used to transmit secure data in various ways. For instance, FIG. 5 shows an example diagram 500 of how each phone/smartphone can transmit secure data acoustically by modulating data through the phone's own vibration mechanism, according to example embodiments.

Figure 6:
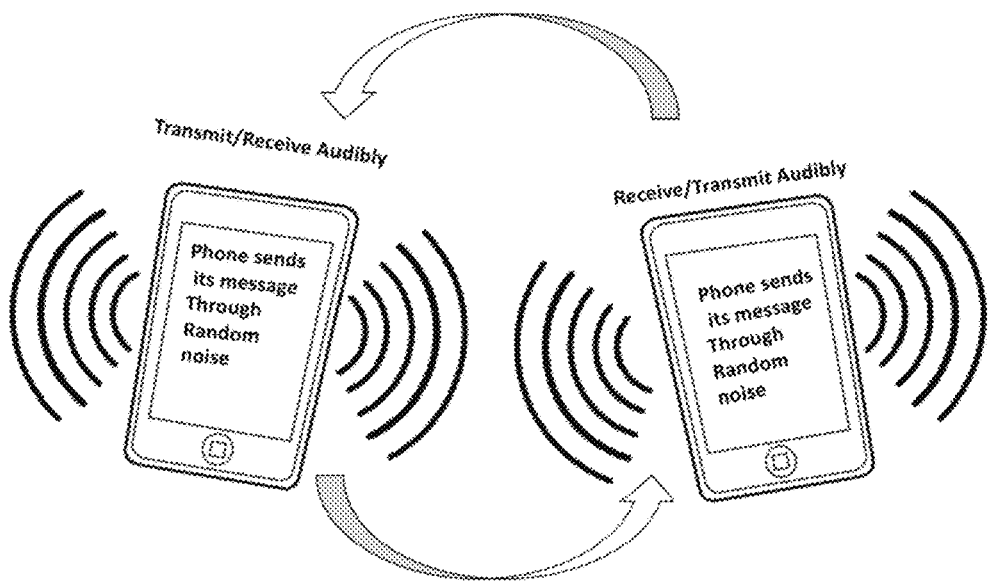
FIG. 6 shows an example diagram of how each device can transmit secure data audibly through white noise by modulating data through the device's own speaker mechanism, according to example embodiments.

FIG. 6 shows an example diagram 600 of how each phone/smartphone can transmit secure data audibly through white noise by modulating data through the phone's own speaker mechanism, according to example embodiments.

Alternatively, FIG. 7 shows an example diagram 700 of how each phone/smartphone can transmit secure data optically by modulating data randomly through the phone's own flashing light mechanisms, according to example embodiments.

For instance, and as shown in FIG. 7, the SD displays an optical pattern on a display screen, which the user's phone reads with its camera to secure its first RNK1. Other various secure forms of communications could also be employed between the SD and the user's phone, as described above and shown in FIGS. 5-7, such as sound, vibration, and/or optically.

Thereafter, for any transaction using the SUIT, the SUIT first authenticates the user by the user biometric validation information and rejects any unauthorized user that fails the authentication.

On a first transaction involving a first transmission back to the SDB, the transmitted data is keyed with the first RNK1 cipher key. Because all data communication includes the ARNID, the SDB retrieves the first cipher key it created for the ARNID, and encodes return information with it, including the next user RNK2 cipher key. On receipt, the SUIT decodes the data stream with its first RNK1 cipher key, and retrieves the next RNK2 cipher key and replaces the first RNK1 cipher key with it. In this way each data transmission with the SDB creates the next RNKn cipher key, implementing the security benefit of the one-time random number keypad, which is virtually unbreakable, and all data transmissions are secured with this continuously updated cipher key.

The SDB itself is a block chain database, with the blocks containing both a data file and at least one 256-bit random number (RN). If secure data transmission requires greater than 256-bits, the 256-bit RNs can be linked together to form longer cipher keys. The RNs chain the blocks together in "nested" groupings. This becomes even more clear in the following application examples.

Figure 9:
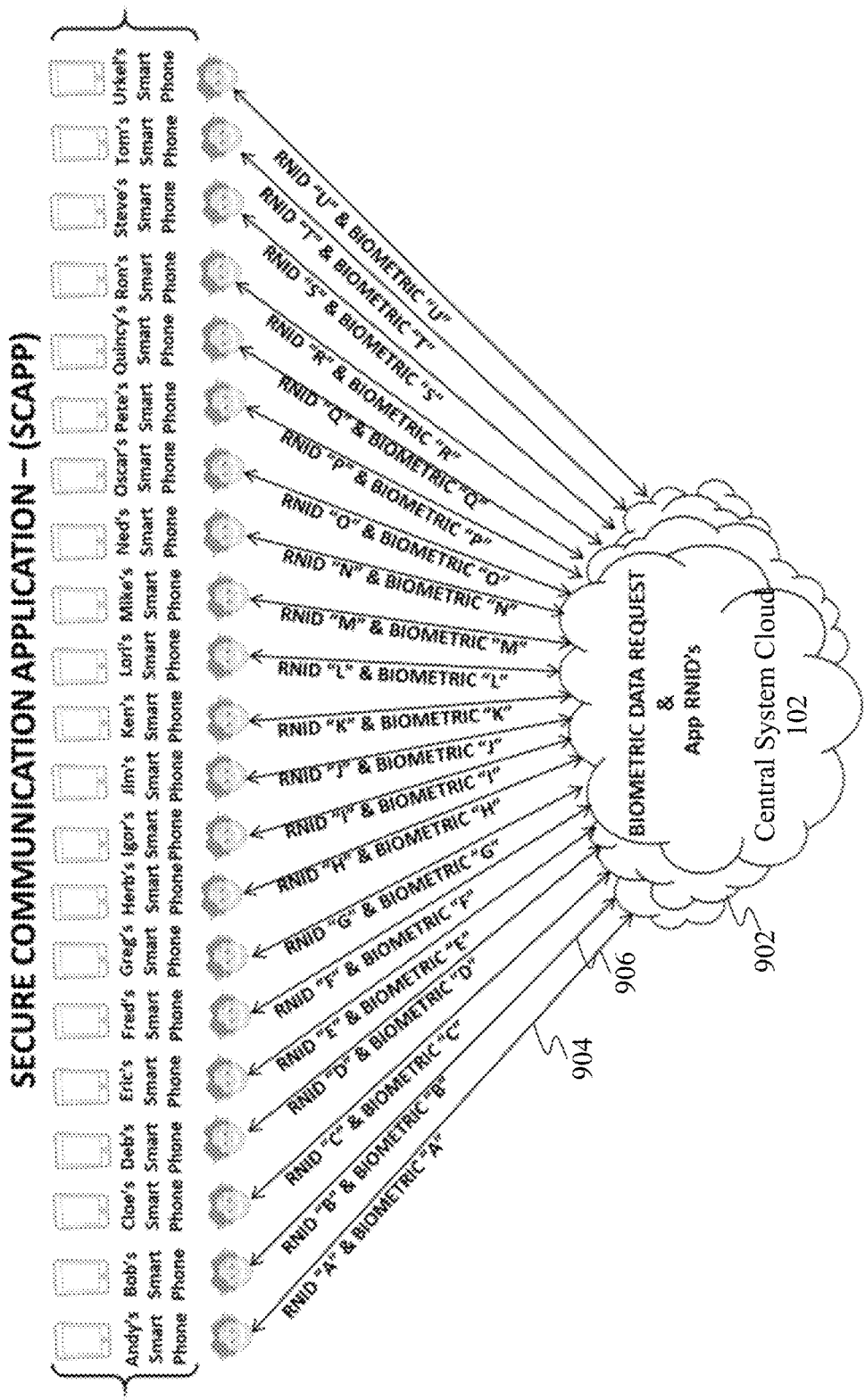
FIG. 9 shows an example diagram of a NFC Secure Communication Application (SCAPP) defined by the assignment of a RNID to specific biometric database through the secure cloud, according to example embodiments.

FIG. 9 shows an example diagram 900 of a NFC Secure Communication Application (SCAPP) defined by the assignment of a RNID to a specific biometric database through the secure cloud 902, according to example embodiments.

As shown in FIG. 9, User "A" 904 desires to communicate securely with User "B," so his SUIT sends User "B's"

SUIT a request for User "As" to send a secure message to User "B" 906. On User "B"'s affirmative, which includes sending out his App's ARNID, User "A"'s SUIT requests a transaction block for that communication from the SDB, using the secure protocol described above, which includes the ARNIDs for both User "A"'s and User "B's" SUIT. The SDB retrieves the RNK's associated with those ARNIDs, which generates a random number communication key, RNCK, and XORs it or otherwise encodes it with the two RNKs to create two RNes, one for User "A", RNea, and one for User "B", RNeb. It then sends RNea to User "A"'s SUIT, which uses its RNK to decode and retrieve the RNCK, and to User "B"'s SUIT, which uses its RNK to decode and retrieve the RNCK. Then User "A" can encode his message with the RNCK to send to User "B", who then decodes it with the RNCK. This process can be repeated for the return message, and so on, back and forth, until the termination of the communication. Since a new key is always encrypted by the previous, any observer will just see a string of undecipherable random numbers. The process also will be transparent to the users. Their SUITs are doing all the work for them through the SDB. If a 256-bit RNCK is not sufficient to encode an entire message, then multiple 256-bit RNCK's can be sent to ensure the entire message is properly encoded.

For User A to communicate securely with multiple persons (who are in his authorized contact list of SUIT users), his SUIT would send out the request to everyone he wishes to communicate with, upon which the ARNID's would come in as a list, and that list is sent to the SDB. The SDB would retrieve the RNKs from all the ARNID's in the list, encrypt a new RNCK with all these RNKs to generate RNe's to be send out to the SUITs of all those in the list, and those SUITs would decrypt their respective RNe with their RNK to retrieve the RNCK, which is used to decrypt the message from User A. In this way User A can send the same message securely to multiple users all at once.

Figure 10:
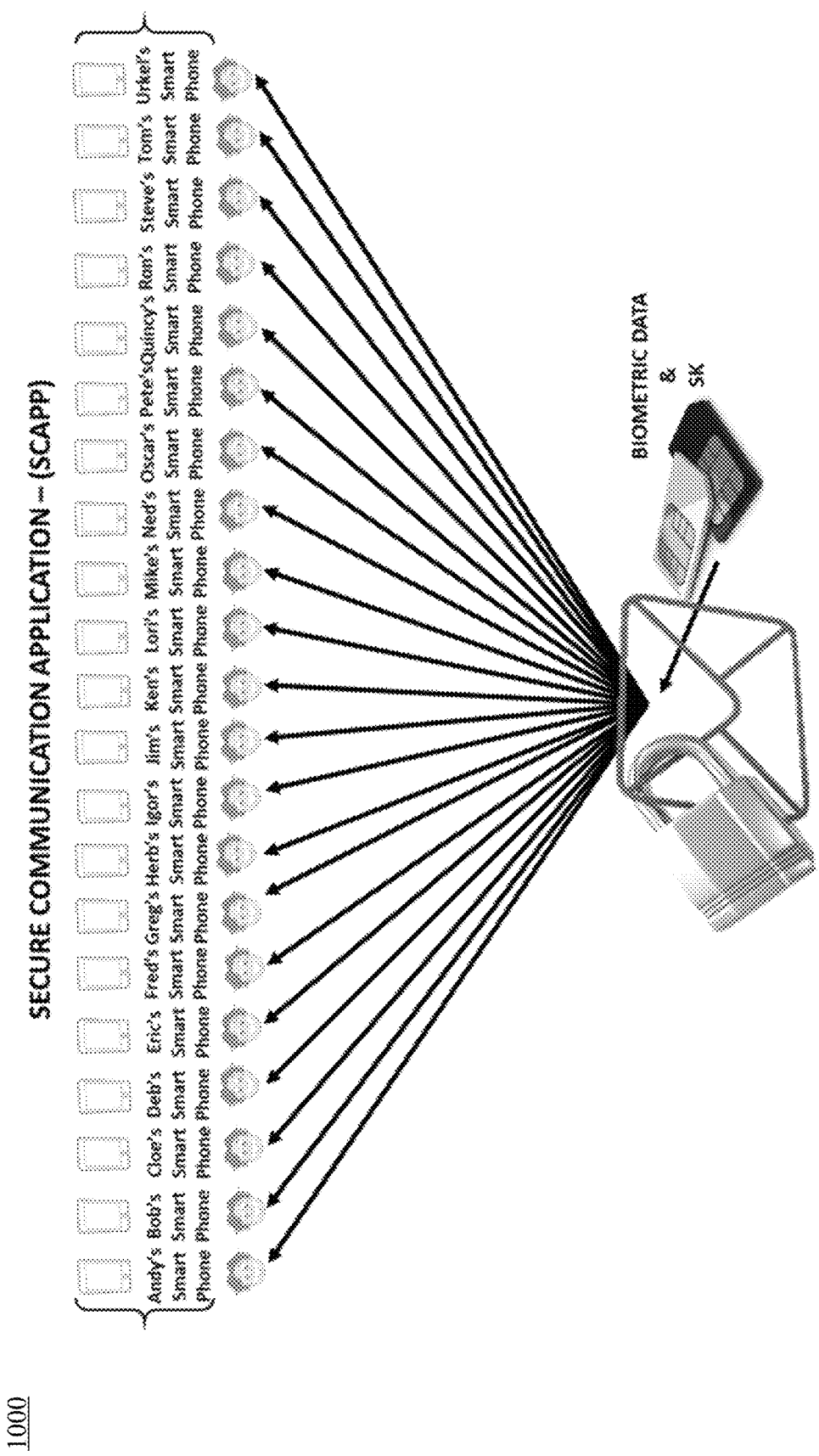
FIG. 10 shows an example diagram of a NFC Secure Communication Application (SCAPP) further defined by the assignment of a secure key generated using the RNID assigned to specific biometric databases through the secure cloud, according to example embodiments.

FIG. 10 shows an example diagram 1000 of a NFC Secure Communication Application (SCAPP) further defined by the assignment of a secure key generated using the RNID assigned to specific biometric databases through the secure cloud, according to example embodiments.

It is noted that embodiments may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
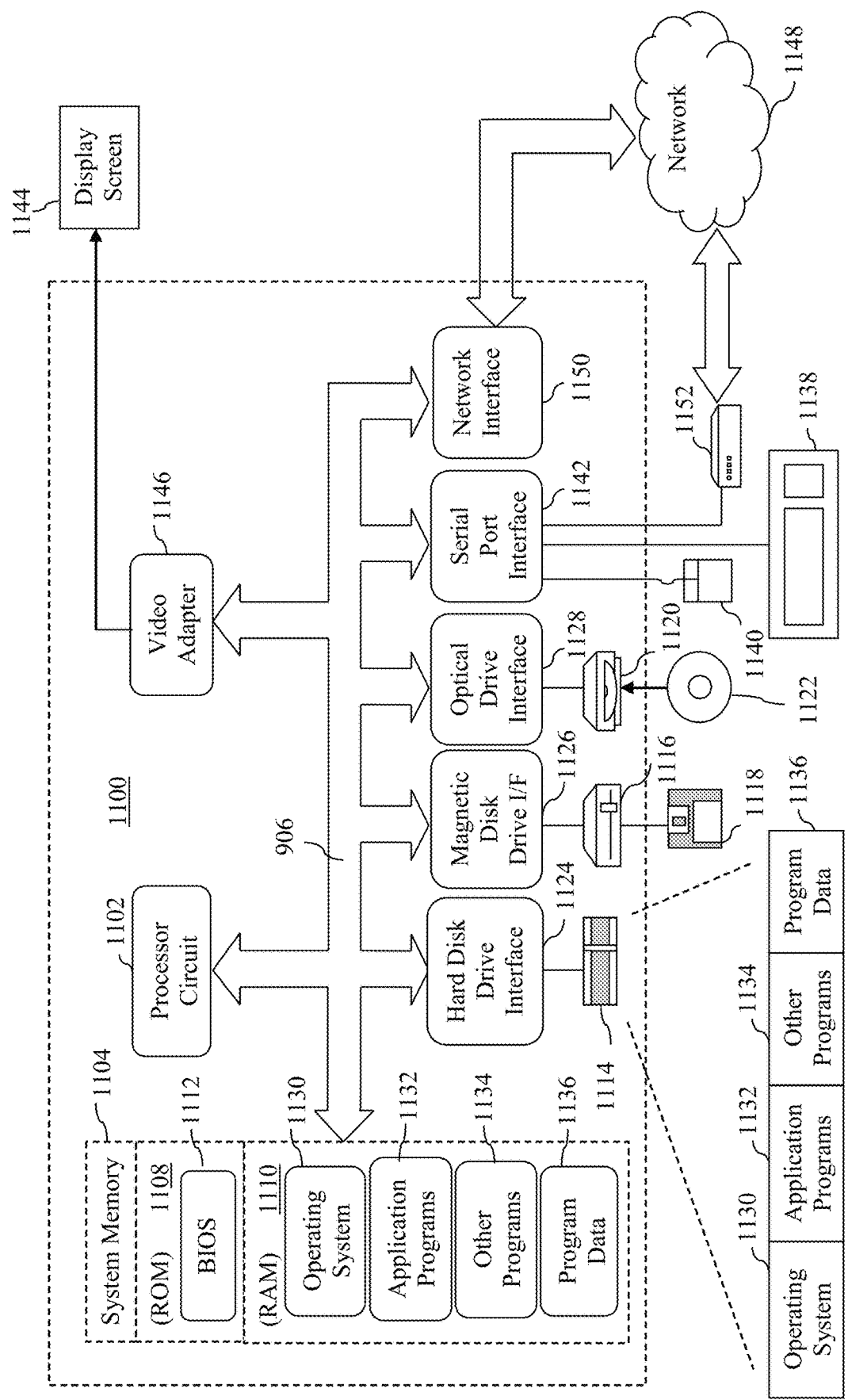
FIG. 11 is a block diagram of a computing device/system in which the techniques disclosed herein may be performed and the example embodiments herein may be utilized.

FIG. 11 depicts an exemplary implementation of a computing device 1100 in which embodiments may be implemented. For example, computing device 1100 may be used to implement smartphone 140, secure random number generator 144, servers and/or other devices in central system cloud 102, and to operate any databases shown in FIGS. 1-10, as described above. Note that implementations of computing devices in the present application may include all or a portion of the features of computing device 1100, and/or additional computing device features not shown in FIG. 11 but described elsewhere herein or otherwise known. The description of computing device 1100 provided herein is provided for purposes of illustration and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g. solid-state drives (SSDs)), digital video disks, RAMs, ROMs, and other hardware storage media.

A number of program modules or components may be stored on the hard disk, magnetic disk, optical disk, ROM, or RAM. These program modules include an operating system 1130, one or more application programs 1132, other program modules 1114, and program data 1136. In accordance with various embodiments, the program modules may include computer program logic that is executable by processing unit 1102 to perform any or all the functions and features of the embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments described herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1102 to perform any or all of the functions and features of FIGS. 1-10, as described above.

Example Embodiments

A secure communication system is described herein. The system uses one-time "pad" random numbers (RNs) that are generated and wirelessly distributed to users from a secure source, referred to as the "Secure Data Base", or SDB for brevity, and where the RNs are also referred to as the random number "secure keys", or RNKs for short.

In embodiments, the random numbers are greater or equal to 256 bits.

In embodiments, the RNKs are distributed through the interface of a secure user interface transaction (SUIT) app that is downloaded to the user smartphone from the SDB, along with a unique application random number ID for the SUIT, referred to as the ARNID.

In embodiments, the SUIT is first downloaded; it requests the input of user authentication and verification biometric data for user validation, which it thereafter uses to authenticate the user.

In embodiments, a first random number key, RNK, is created by a RNKC (RN Key Card) tag pair which is available to users at local authorized kiosk or cellphone service provider stores or common retail outlets or stores, such as gas station, grocery stores, convenience stores, or the like and also could be dispensed by vending machines where a RNKC will be presented or sold to the user.

In embodiments, the user instructs the SUIT into "key acquisition" (KA) mode, at which point the SUIT instructs the use to "tap" the phone to one of the tags for it to read the tag's RN, which the SUIT sends to the SDB along with its ARNID; whereby the RNs of the two tags on the RNKC will have been previously created and paired in the database as a RNK and key identifier (KI) RNKC pair (RNKCP) so that when the RN sent to the SDB by the SUIT will now become the KI of the RNKCP and the other will become the first RNK1 associated with the SUIT ARNID followed by the instructions to the user to "tap" the other tag and the smartphone will read that tags RN, which the SUIT reads into its memory as its first RNK1.

In embodiments, the first secure communication of the SUIT to the SDB will use the first key to encrypt the message data, and where the SDB will use that first key (RNK) to decrypt the message; and where the first return message from the SDB will be encrypted with the first key, and will include as a "postamble" a second key; where when the SUIT decrypts the return message from the SDB with the first key, it will retrieve the second key, and replace the first key with the second key to encrypt the next secure message to the SDB, which, in effect, replaces (over writes) the first "one-time pad" with a second; and so on with subsequent messages where a new SK replaces the previous one.

In embodiments, secure communication between authorized SUIT users is accomplished by the following; a first person desires to communicate securely with a second person, so his SUIT sends the second person's SUIT a request for the first person to send a secure message to the second person, and where on the second person's affirmative, which includes sending out his SUIT's ARNID, the first person's SUIT requests a transaction block for that communication from the SDB, using the secure communication protocol, which includes the ARNID for both his and the second person's SUIT, upon which the SDB retrieves the RNKs associated with those ARNID's, generates a random number communication key, RNCK, and XORs it, or otherwise encodes it, with the RNKs to create two RNe's, one for the first person, RNe1, and one for the second person, RNe2, which it then sends RNe1 to the first person's SUIT, which uses its RNK to decode and retrieve the RNCK, and to the second person's SUIT, which uses its RNK to decode and retrieve the RNCK, whereby the first person can then encode his message with the RNCK to send to the second person, who decodes it with the RCKN, achieving one one-time pad random number encryption for secure communication.

In embodiments, the RNKC is physically printed or sent electronically optically, acoustically (i.e., sound/vibration), by the user's smartphone camera.

In embodiments, for a first person to communicate securely with multiple persons (who are in his authorized contact list of SUIT users), his SUIT would send out the request to everyone he wishes to communicate with, upon which the ARNID's would come in as a list, and that list is sent to the SDB, upon which the SDB would retrieve the RNKs from all the ARNID's in the list, encrypt a new RNCK with all these RNKs to generate RNe's to be sent out to the SUITs of all those in the list, and those SUITs would decrypt their RNe with their RNK to retrieve the RNCK, which is used to decrypt the message from the first person, thereby, in this way, a first person can send the same message securely to multiple users all at once.

In a further embodiment, a secure communication system comprises: a secure random number ID generator as part of a Secure Database (SDB) configured to: generate a one-time pad random number secure key (RN); and wirelessly distribute the RN to a user of a smartphone, wherein a secure user interface transaction (SUIT) app has been downloaded to the smartphone and the SUIT app has a unique application random number ID (ARNID); and a personal assistant database configured to store the ARNID.

In an embodiment of the system, the RN is greater or equal to 256 bits.

In an embodiment of the system, the RN is distributed through an interface of the SUIT app.

In an embodiment of the system, prior to the SUIT app being downloaded, the SUIT app is configured to request user authentication and verification user biometric data.

In an embodiment of the system, the secure random number ID generator is further configured to generate a first random number key, RNK, by a RNKC (RN Key Card) tag pair, and wherein the RNK available to the user in one or more of: a local authorized kiosk; a cellphone service provider store; a common retail outlets or store; or vending machines where a RNKC will be presented or sold to the user.

In an embodiment of the system, the SUIT app is configured to: receive user instruction into key acquisition (KA) mode; in response to receiving an instruction to enter the KA mode, instructing the user to tap the phone to one of the tags to read the tag's RN; and transmit the tag's RN and ARNID to a secure database (SDB).

In an embodiment of the system, the SUIT app is configured to use a first key to encrypt message data to the secure database (SDB) as a first secure communication; the SDB is configured to: use that first key (RNK) to decrypt the message data; encrypt a first return message with the first key; and transmit the first return message and a postamble second key from the SDB; and the SUIT app is further configured to: decrypt the return message from the SDB with the first key; retrieve the second key; replace the first key with the second key; and encrypt the next secure message with the second key to the SDB.

In an embodiment of the system, the SUIT app is configured to: transmit a request to a second SUIT app to transmit a secure message; receive an affirmative signal and a second ARNID from the second SUIT app, the second ARNID associated with the second SUIT; transmit a request for a transaction block for communication from the secure database (SDB), the request using the secure communication protocol which includes the ARNID and the second ARNID; the SDB is configured to: retrieve the RNK associated with the ARNID and the RNK associated with the second ARNID; generate a random number communication key (RNCK); encode the RNKs to create two RNe's; transmit the two RNes to the SUIT to be used to decode and retrieve the RNCK; and the second SUIT is configured to use the RNEs to decode and retrieve the RNCK, wherein the first person can then encode his message with the RNCK to send to the second person, who decodes it with the RNCK.

In an embodiment of the system, the RNCK is physically printed or sent by one or more of: electronically; optically; acoustically, or by a camera of the smartphone.

In an embodiment of the system, the SUIT transmits a request to devices; wherein a list is transmitted to the SDB; wherein the SDB retrieves the RNKs from all the ARNID's in the list, encrypts a new RNCK to generate RNe's, and transmits the RNe's to the SUITs such that the SUITs are enabled to decrypt the RNe with their RNK to retrieve the RNCK, which is used to decrypt a message.

In another embodiment, in a server, a method comprises: downloading a secure user interface transaction (SUIT) app to a smartphone; assigning a unique application random number ID (ARNID) to the smartphone; transmitting the ARNID to the smartphone for storage thereby; generating a one-time pad random number secure key (RN); and wirelessly distributing the RN to the smartphone.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the following claims and their equivalents.

What is claimed is:

1. A server in a secure communication system, the server comprising:
  a secure random number ID (identifier) generator configured to:
  generate a one-time pad random number secure key (RN); and
  wirelessly distribute the RN to a user of a smartphone, wherein a first secure user interface transaction (SUIT) app downloaded to the smartphone has a unique first application random number ID (ARNID);
  wherein the smartphone is enabled to engage in a secure transaction by the first SUIT app at least using the ARNID as a public identifier for the first SUIT app and the RN and wherein the first SUIT app is configured to:
  transmit a request to a second SUIT app to transmit a secure message;
  receive an affirmative signal and a second ARNID from the second SUIT app, the second ARNID associated with the second SUIT app; and
  transmit a request for a transaction block for communication from the server, the request using a secure communication protocol which includes the first ARNID and the second ARNID.

2. The server of claim 1, wherein the RN has a value greater than or equal to 256 bits.

3. The server of claim 1, wherein the RN is distributed through an interface of the first SUIT app.

4. The server of claim 3, wherein the first SUIT app is configured to request user biometric data after the first SUIT app is downloaded.

5. The server of claim 1, wherein:
the server is configured to:
retrieve a first random number key (RNK) associated with the first ARNID and a second RNK associated with the second ARNID;
generate a random number communication key (RNCK);
encode the first and second RNKs to create first and second encoded RNKs (RNes);
transmit the first and second RNes to the second SUIT app; and
the second SUIT app is configured to use the first and second RNEs to decode and retrieve the RNCK, wherein a first person is enabled to encode the secure message with the RNCK to send to a second person who is enabled to decode the secure message with the RNCK.

6. The server of claim 5, wherein the first SUIT app transmits a request to devices having downloaded SUIT apps with associated ARNIDs;
wherein a list is transmitted to the server;
wherein the server is further configured to:
retrieve, from the devices, the RNKs associated with the ARNIDs in the list from the devices,
encrypt a new RNCK to generate RNes, and
transmit the RNes to the first and second SUIT apps such that the first and second SUIT apps are each enabled to decrypt the RNes with their respective RNK to retrieve the RNCK, which is used to decrypt a message.

7. The server of claim 1, further comprising:
a personal assistant database configured to store the first ARNID.

8. A server in a secure communication system, the server comprising:
a secure random number ID (identifier) generator configured to:
generate a one-time pad random number secure key (RN);
wirelessly distribute the RN to a user of a smartphone, wherein a first secure user interface transaction (SUIT) app downloaded to the smartphone has a unique first application random number ID (ARNID); and
generate a first random number key (RNK) by a RNKC (RN Key Card) tag pair;
wherein, the first SUIT app is configured to:
receive user instruction into key acquisition (KA) mode;
in response to receiving an instruction to enter the KA mode, instruct the user to tap the phone to a first tag of the RNKC tag pair to read the RN of the first tag; and
transmit the RN of the first tag and the first ARNID of the first SUIT app to the server; and
wherein the smartphone is enabled to engage in a secure transaction by the first SUIT app at least using the ARNID as a public identifier for the first SUIT app and the RN.

9. The server of claim 8, where the RNKC is physically printed or sent by one or more of:
electronically;
optically;
acoustically, or
by a camera of the smartphone.

10. A server in a secure communication system, the server comprising:
a secure random number ID (identifier) generator configured to:
generate a one-time pad random number secure key (RN); and
wirelessly distribute the RN to a user of a smartphone, wherein a first secure user interface transaction (SUIT) app downloaded to the smartphone has a unique first application random number ID (ARNID);
wherein the first SUIT app is configured to use a first key, which is a random number key (RNK), to encrypt message data to the server as a first secure communication;
wherein the server is configured to:
use the first key to decrypt the encrypted message data;
encrypt a first return message with the first key; and
transmit the first return message, including a postamble second key, from the server; and
wherein the smartphone is enabled to engage in a secure transaction by the first SUIT app at least using the ARNID as a public identifier for the first SUIT app and the RN.

11. A method in a server, comprising:
downloading a first secure user interface transaction (SUIT) app to a smartphone;
assigning a unique application random number identifier (ARNID) to the smartphone;
transmitting the ARNID to the smartphone for storage thereby;
generating a one-time pad random number secure key (RN); and
wirelessly distributing the RN to the smartphone, the smartphone enabled to engage in a secure transaction by the first SUIT app at least using the ARNID as a public identifier for the first SUIT app and the RN,
wherein the first SUIT app is configured to:
receive user instruction into key acquisition (KA) mode;
in response to receiving an instruction to enter the KA mode, instruct the user to tap the phone to a first tag of the RNKC tag pair to read the RN of the first tag; and
transmit the RN of the first tag and the first ARNID of the first SUIT app to the server.

12. The method of claim 11, wherein the RN has a value that is greater than or equal to 256 bits.

13. The method of claim 11, wherein the RN is distributed through an interface of the first SUIT app.

14. The method of claim 13, wherein the first SUIT app is configured to request user authentication and verification user biometric data after the first SUIT app is downloaded.

15. The method of claim 11, further comprising:
generating a first random number key (RNK) by a RNKC (RN Key Card) tag pair, and wherein the first RNK available is to a user in at least one of:
a local authorized kiosk;
a cellphone service provider store;
a common retail outlet or store; or
a vending machine where a RNKC is presented to or sold to the user.

16. The method of claim 15, where the RNKC is physically printed or sent by one or more of:

electronically;
optically;
acoustically, or
by a camera of the smartphone.

17. The method of claim 11, wherein the first SUIT app is configured to use a first key, which is a random number key (RNK), to encrypt message data to the server as a first secure communication, the method further comprising:
using the first key to decrypt the message data received in the first secure communication;
encrypting a first return message with the first key; and
transmitting the first return message, including postamble second key, from the server; and
wherein the first SUIT app is further configured to:
decrypt the return message received from the server with the first key;
retrieve the second key from the decrypted return message;
replace the first key with the second key; and
encrypt a next secure message to the server with the second key.

18. The method of claim 11, wherein:
the first SUIT app is configured to: transmit a request to a second SUIT app to transmit a secure message;
receive an affirmative signal and a second ARNID from the second SUIT app, the second ARNID associated with the second SUIT app;
transmit a request for a transaction block for communication from the server, the request using a secure communication protocol which includes the first ARNID and the second ARNID;
the method further comprises:
retrieving a first random number key (RNK) associated with the first ARNID and a second RNK associated with the second ARNID;
generating a random number communication key (RNCK);
encoding the first and second RNKs to create first and second encoded RNKs (RNes);
transmitting the first and second RNes to the second SUIT app; and the second SUIT app is configured to use the first and second RNes to decode and retrieve the RNCK, wherein a first person is enabled to encode the secure message with the RNCK to send to a second person who is enabled to decode the secure message with the RNCK.

19. The method of claim 18, wherein the first SUIT app transmits a request to devices having downloaded SUIT apps with associated ARNIDs;
wherein a list is transmitted to the server;
the method further comprising:
retrieving, from the devices, the RNKs associated with the ARNIDs in the list from the devices,
encrypting a new RNCK to generate RNes, and
transmitting the RNes to the first and second SUIT apps such that the first and second SUIT apps are each enabled to decrypt the RNes with their respective RNK to retrieve the RNCK, which is used to decrypt a message.

20. The method of claim 11, further comprising storing the first ARNID in a personal assistant database of the server.

* * * * *